United States Patent
da Silva

(10) Patent No.: US 7,018,299 B2
(45) Date of Patent: Mar. 28, 2006

(54) ROLLING BALL SPLINE SLIP JOINT WITH HELICALLY SHAPED CAGE

(75) Inventor: Jose P. da Silva, Toledo, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 219 days.

(21) Appl. No.: 10/442,471

(22) Filed: May 21, 2003

(65) Prior Publication Data

US 2004/0235573 A1 Nov. 25, 2004

(51) Int. Cl.
*F15C 3/03* (2006.01)

(52) U.S. Cl. .................... 464/167; 403/359.6
(58) Field of Classification Search ............... 464/167, 464/168; 384/49, 51; 403/359.1, 359.2, 403/359.3, 359.4, 359.5, 359.6
See application file for complete search history.

(56) References Cited

U.S. PATENT DOCUMENTS

| 2,381,770 A | 8/1945 | Overly |
| 2,936,646 A | 5/1960 | Gould |
| 2,992,548 A | 7/1961 | Walterscheid-Muller et al. |
| 4,685,344 A | 8/1987 | Horn et al. |
| 4,699,522 A | 10/1987 | Engel et al. |
| 4,773,114 A | 9/1988 | Thrasher |
| 4,981,459 A | 1/1991 | Klinkenberg |
| 5,156,462 A * | 10/1992 | Jacob et al. ................. 384/49 |
| 6,089,303 A | 7/2000 | Metcalf et al. |
| 6,439,072 B1 * | 8/2002 | Kajita et al. ............. 384/49 X |

FOREIGN PATENT DOCUMENTS

| FR | 871065 | 4/1942 |
| FR | 1193175 | 10/1959 |
| GB | 2395995 | 6/2004 |

* cited by examiner

*Primary Examiner*—John R. Cottingham
(74) *Attorney, Agent, or Firm*—MacMillan, Sobanski & Todd, LLC

(57) ABSTRACT

A slip joint includes a slip shaft having a plurality of axially extending grooves, and a slip yoke having a plurality of axially extending grooves. The slip yoke is in telescoping engagement with the slip shaft, and the grooves formed in the slip shaft are circumferentially aligned with the grooves formed in the slip yoke. A plurality of torque transmitting balls is disposed in the grooves. A helically shaped cage is positioned radially between the slip shaft and the slip yoke. The cage secures the balls to maintain the balls spaced apart from one another and within the grooves.

20 Claims, 5 Drawing Sheets

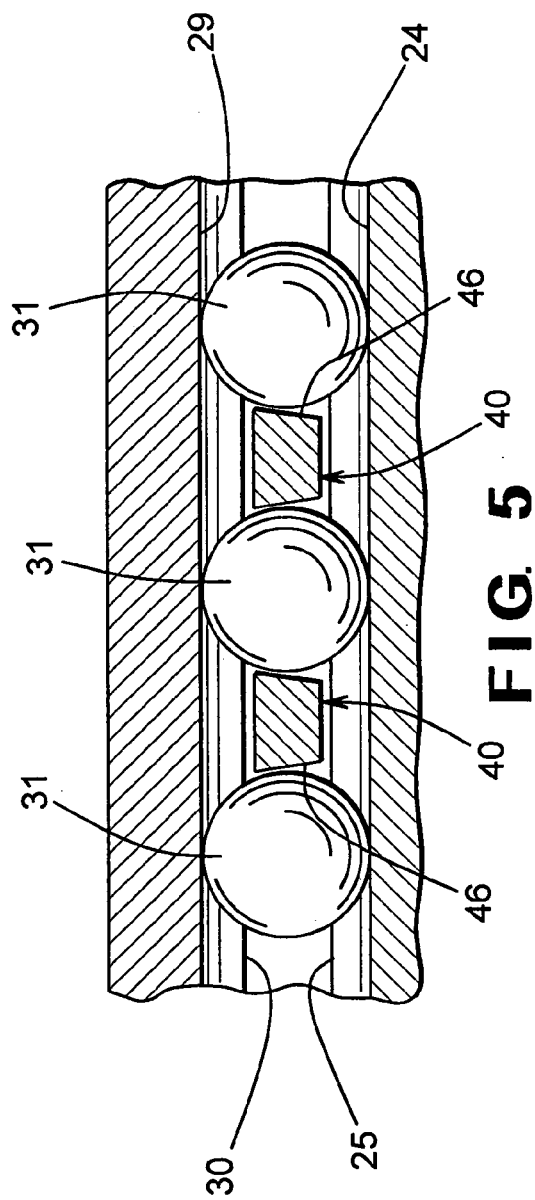
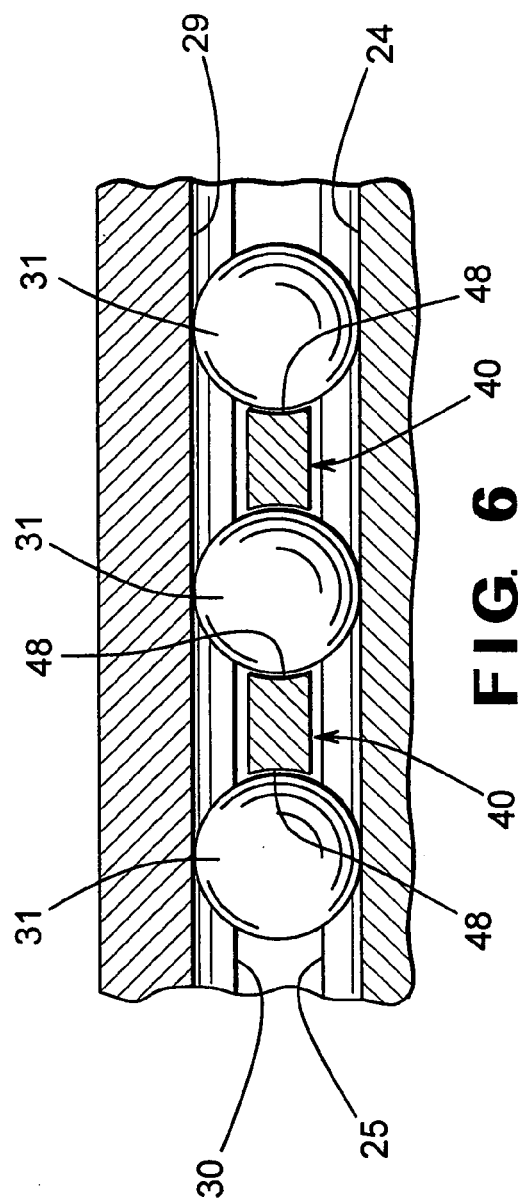

ROLLING BALL SPLINE SLIP JOINT WITH HELICALLY SHAPED CAGE

BACKGROUND OF THE INVENTION

This invention relates in general to the manufacture of slip joints, such as are commonly used in vehicle drive train systems, for transmitting rotational force or torque between axially movable components. In particular, this invention relates to an improved structure for a cage for maintaining the balls in a rolling ball spline type of slip joint in a spaced apart relationship.

Drive train systems are widely used for transferring power from a power source to a driven mechanism. Frequently, the power source generates rotational power, and such rotational power is transferred from the power source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but also typically it must accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A typical slip joint includes first and second members that have respective structures formed thereon that cooperate with one another for concurrent rotational movement, while permitting a limited amount of axial movement to occur therebetween. Two types of slip joints are commonly used in conventional driveshaft assemblies, namely, a sliding spline type and a rolling ball spline type.

A typical rolling ball spline type of slip joint includes male and female members having respective pluralities of longitudinally extending grooves formed thereon. The male member is generally cylindrical in shape and has a plurality of inwardly extending grooves formed in the outer surface thereof. The male member may be formed integrally with or secured to an end of the driveshaft assembly described above. The female member, on the other hand, is generally hollow and cylindrical in shape and has a plurality of outwardly extending grooves formed in the inner surface thereof. The female member may be formed integrally with or secured to a yoke that forms a portion of one of the universal joints described above. To assemble the slip joint, the male member is inserted within the female member such that the inwardly extending grooves of the male member are aligned with the outwardly extending grooves of the female member. A plurality of torque transfer balls is disposed in each of the aligned pairs of the grooves. As a result, the male and female members are connected together through the torque transfer balls for concurrent rotational movement. However, the male member can slide relative to the inwardly extending splines of the female member to allow a limited amount of relative axial movement to occur between the engine/transmission assembly and the axle assembly of the drive train system.

Typically, a rolling ball spline slip yoke includes a cage or retainer that extends between the male and female members and maintains the balls disposed in each of the aligned pairs of the grooves in a spaced apart relationship from one another. Thus, the cage is provided to prevent adjacent ones of these balls from engaging one another during relative axial movement of the male and female members. It has been found that such engagement of the balls during relative axial movement of the male and female members can adversely affect the operation of the rolling ball spline slip yoke. However, known cage structures have been found to be relatively complicated in structure and expensive to manufacture. Thus, it would be desirable to provide an improved structure for such a cage that is relatively simple in structure and inexpensive to manufacture.

SUMMARY OF THE INVENTION

This invention relates to an improved structure for a cage for maintaining the balls in a rolling ball spline type of slip joint in a spaced apart relationship. The cage is relatively simple in structure and inexpensive to manufacture. According to this invention there is provided a slip joint that include a slip shaft having a plurality of axially extending grooves, and a slip yoke having a plurality of axially extending grooves. The slip yoke is in telescoping engagement with the slip shaft, and the grooves formed in the slip shaft are circumferentially aligned with the grooves formed in the slip yoke. A plurality of torque transmitting balls is disposed in the grooves. A helically shaped cage is positioned radially between the slip shaft and the slip yoke. The cage secures the balls to maintain the balls spaced apart from one another and within the grooves. According to this invention there is also provided a drive train assembly that includes the helically shaped cage. According to this invention there is also provided a method for making a helically shaped cage for a slip joint. The helically shaped cage is made by a molding process. More preferably, the helically shaped cage is formed with a continuous molding process. Preferably, the helically shaped cage is formed by an extrusion process.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a sectional elevational view of the ball cage of FIG. 4, taken along line 5—5.

FIG. 6 is a similar to that shown in FIG. 5, but showing an alternate cross-sectional shape.

DETAILED DESCRIPTION OF THE PREFERRED EMBODIMENT

Figure 1:
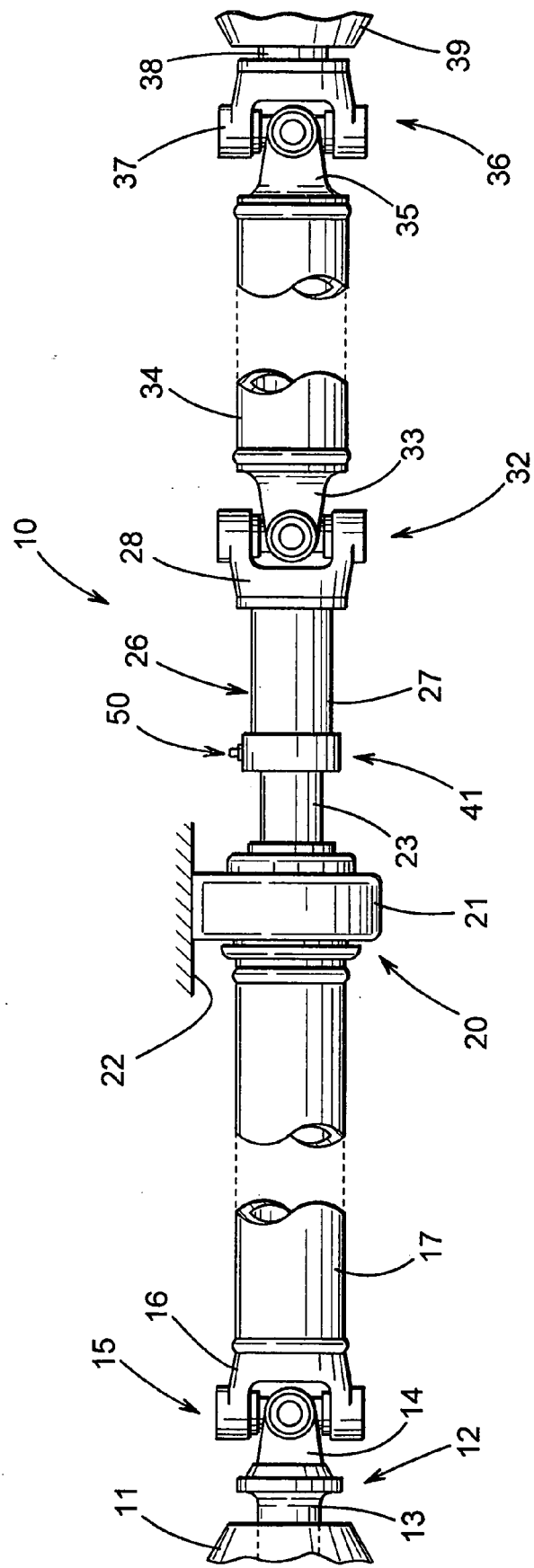
FIG. 1 is a side elevational view of a vehicle drive train assembly.

Referring now to the drawings, there is illustrated in FIG. 1 a drive train assembly, indicated generally at 10, for a vehicle which is adapted to transmit rotational power from an engine/transmission assembly 11 to a plurality of driven wheels (not shown). The engine/transmission assembly 11 is conventional in the art is and typically includes an externally splined output shaft (not shown) which is connected to a first slip yoke assembly, indicated generally at 12. The first slip yoke assembly 12 is conventional in the art and includes an internally splined tubular end portion 13 which slidably engages the externally splined output shaft of the engine/transmission assembly 11. As a result, the tubular end portion 13 of the first slip yoke assembly 12 is rotatably driven by the output shaft of the engine/transmission assembly 11, but is free to move axially relative thereto to a limited extent.

The first slip yoke assembly 12 further includes a yoke 14, which forms one part of a first universal joint assembly, indicated generally at 15. The first universal joint assembly 15 is also conventional in the art and includes a tube yoke 16 which is connected to the yoke 14 by a cross in a known manner. The tube yoke 16 is secured, such as by welding, to a first end of a first driveshaft section 17 for rotation therewith. The first universal joint assembly 15 thus provides a rotational driving connection between the output shaft of the engine/transmission assembly 11 and the first driveshaft section 17, while permitting a limited amount of axial misalignment therebetween. The first universal joint assembly 15 also permits a limited amount of relative axial movement to occur between the output shaft of the engine/transmission assembly 11 and the first driveshaft section 17. Alternatively, the output shaft of the engine/transmission assembly 11 may terminate in a conventional end yoke (not shown) which is directly connected to the cross of the first universal joint assembly 15. Such a structure would not accommodate any relative axial movement to occur between the output shaft of the engine/transmission assembly 11 and the first driveshaft section 17.

The first driveshaft section 17 extends through and is optionally supported for rotation by a center bearing assembly, indicated generally at 20. The center bearing assembly 20 is conventional in the art and includes a rigid frame or bracket 21 which is secured to a portion of a frame, chassis, or body 22 of the vehicle. The first driveshaft section 17 terminates in a reduced diameter end shaft 23, which is a slip shaft. A ball spline type slip yoke, indicated generally at 26, is connected to the reduced diameter end shaft 23 of the first driveshaft section 17 for rotation therewith. The ball spline type slip yoke 26 includes a hollow cylindrical end shaft portion 27 and a yoke portion 28.

The cylindrical end shaft portion 27 cooperates with the reduced diameter end portion 23 to form a slip joint 41 which permits a limited amount of relative axial movement to occur between the ball spline type slip yoke 26 and the first driveshaft section 17. The yoke portion 28 is formed having a pair of opposed yoke arms having respective openings formed therethrough which are adapted to cooperate with a universal joint cross in a conventional manner. An annular external seal, indicated generally at 50, is mounted on the hollow cylindrical end shaft portion 27 of the ball spline type slip yoke 26 and slidably and sealingly engages the outer surface of the reduced diameter end portion 23 of the first driveshaft section 17. The structure and operation of the slip joint 41 will be explained in detail below.

The yoke shaft portion 27 of the ball spline type slip yoke 26 forms one part of a second universal joint assembly, indicated generally at 32. The second universal joint assembly 32 is also conventional in the art and includes a tube yoke 33 which is connected to the yoke 28 by a cross in a known manner. The tube yoke 33 is secured, such as by welding, to a first end of a second driveshaft section 34 for rotation therewith. The second universal joint assembly 32 thus provides a rotational driving connection between the first driveshaft section 17 and the second driveshaft section 34, while permitting a limited amount of axial misalignment therebetween. The second driveshaft section 34 terminates in a second end having a tube yoke 35 secured thereto. The tube yoke 35 forms one part of a third universal joint assembly, indicated generally at 36. The third universal joint assembly 36 is also conventional in the art and includes a tube yoke 37 which is connected to an input shaft 38 of an axle assembly 39 by a cross in a conventional manner. The third universal joint assembly 36 thus provides a rotational driving connection between the second driveshaft section 34 and the input shaft 38 of the axle assembly 39, while permitting a limited amount of axial misalignment therebetween. The axle assembly 39 is conventional in the art and is adapted to transmit rotational power from the input shaft 38 to the driven wheels of the vehicle in a known manner. Although the first slip yoke assembly of the drive train assembly 10 illustrated at 12 is a conventional slip yoke assembly, the drive train assembly 10 may include a ball spline type slip yoke as herein described.

Although the major portions of the drive train assembly 10 have been shown to be conventional in the art, it is to be understood that the first slip yoke assembly 12, first universal joint assembly 15, center bearing assembly 20, second universal joint assembly 32, and third universal joint assembly 36 can of any design suitable for the transmission of rotational force along the drive train 10.

Figure 2:
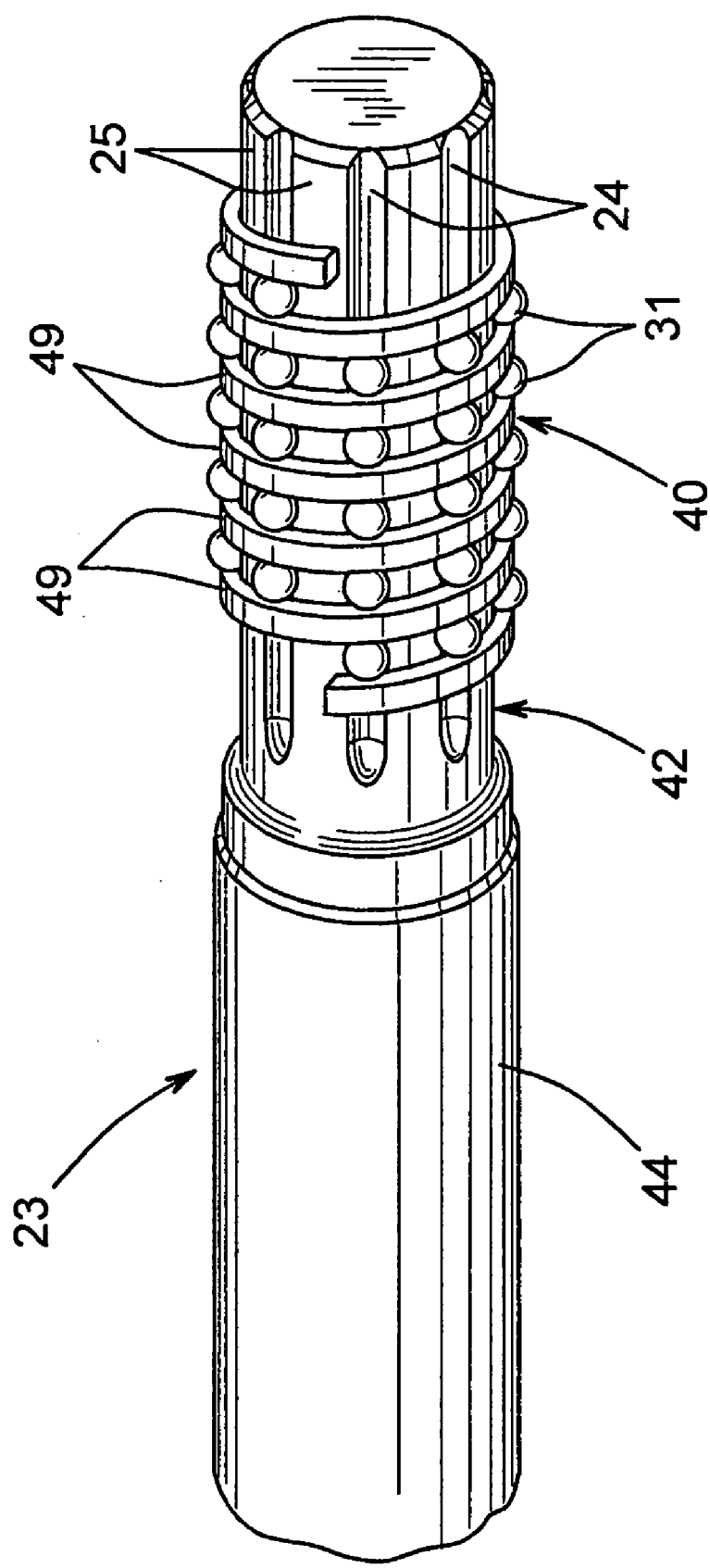
FIG. 2 is a perspective view of the reduced diameter end of the first driveshaft section of a ball spline type slip yoke assembly for connecting a rearward end of a first driveshaft tube section to a forward end of a second driveshaft tube section in accordance with this invention.
Figure 3:
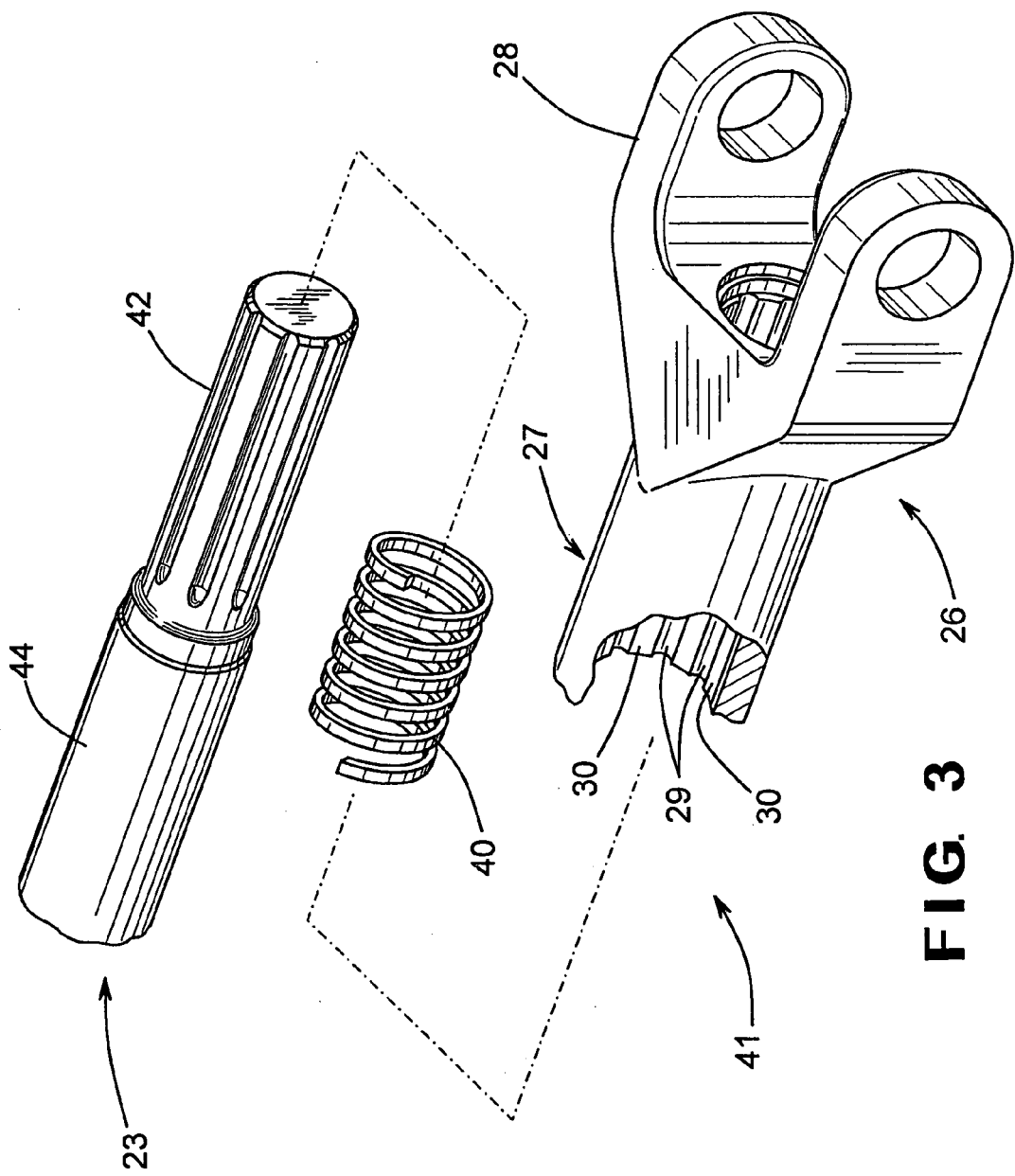
FIG. 3 is an exploded perspective view of the ball spline type slip yoke assembly in accordance with this invention, partially broken away to show the interior of the slip yoke.

Referring now to FIGS. 2 and 3, the structure of the ball spline type slip joint 41 is illustrated in detail. As shown, the slip joint 41 includes the reduced diameter end shaft 23 of the first drive shaft section 17, the hollow cylindrical end shaft portion 27 of the slip yoke 26 telescoped over the reduced diameter end shaft 23, angularly spaced rows of anti-friction torque transfer balls 31 interposed between the reduced diameter end shaft 23 of the first drive shaft section 17 and the hollow cylindrical end shaft portion 27 of the slip yoke 26, and a helically shaped cage 40 for retaining the balls 31. The helically shaped cage 40 is positioned radially between the end shaft 23 and the end shaft portion 27. The balls 31 transmit torque between the end shaft 23 and the end shaft portion 27 and reduce friction during relative axial movement of the end shaft 23 and the end shaft portion 27. The cage restricts the axial movement of the balls 31, and secures the balls to maintain them within the grooves and spaced apart from one another.

The reduced diameter end shaft 23 is formed with a splined portion 42 and an axially adjacent non-splined portion 44. The splined portion 42 is formed with a plurality of circumferentially spaced and axially extending grooves 24 to receive the balls 31. Axially extending splines 25 are defined by the sides of adjacent grooves 24. The inner surface of the hollow cylindrical end shaft portion 27 is formed with a plurality of angularly spaced and axially extending grooves 29 which receive the balls 31. Axially extending splines 30 are defined by the sides of adjacent grooves 29. The grooves 24 and 29 are concavely radiused to accommodate the balls 31 and typically have a radius slightly larger than the radius of each ball 31.

Typically, the end shaft 23 and the slip yoke 26 are formed by a conventional casting process. The grooves 24 and splines 25 of the end shaft 23, and the grooves 29 and splines 30 of the slip yoke 26 can be formed during the casting process by providing an appropriate mold. Alternatively, the grooves 24 and 29, and splines 25 and 30, respectively, can be formed on the end shaft 23 and in the slip yoke 26 after the casting process, such as by machining. Further, the end shaft 23, the slip yoke 26, the balls 31 and cage 40 are formed with such mutual dimensions that the four parts can be moved in relation to each other with a light slip fit. The grooves 24 formed in the end shaft 23 are circumferentially aligned with the grooves 29 in the slip yoke 26 so that the torque transfer balls 31 can transmit rotational power from the end shaft 23 to the slip yoke 26.

Figure 4:
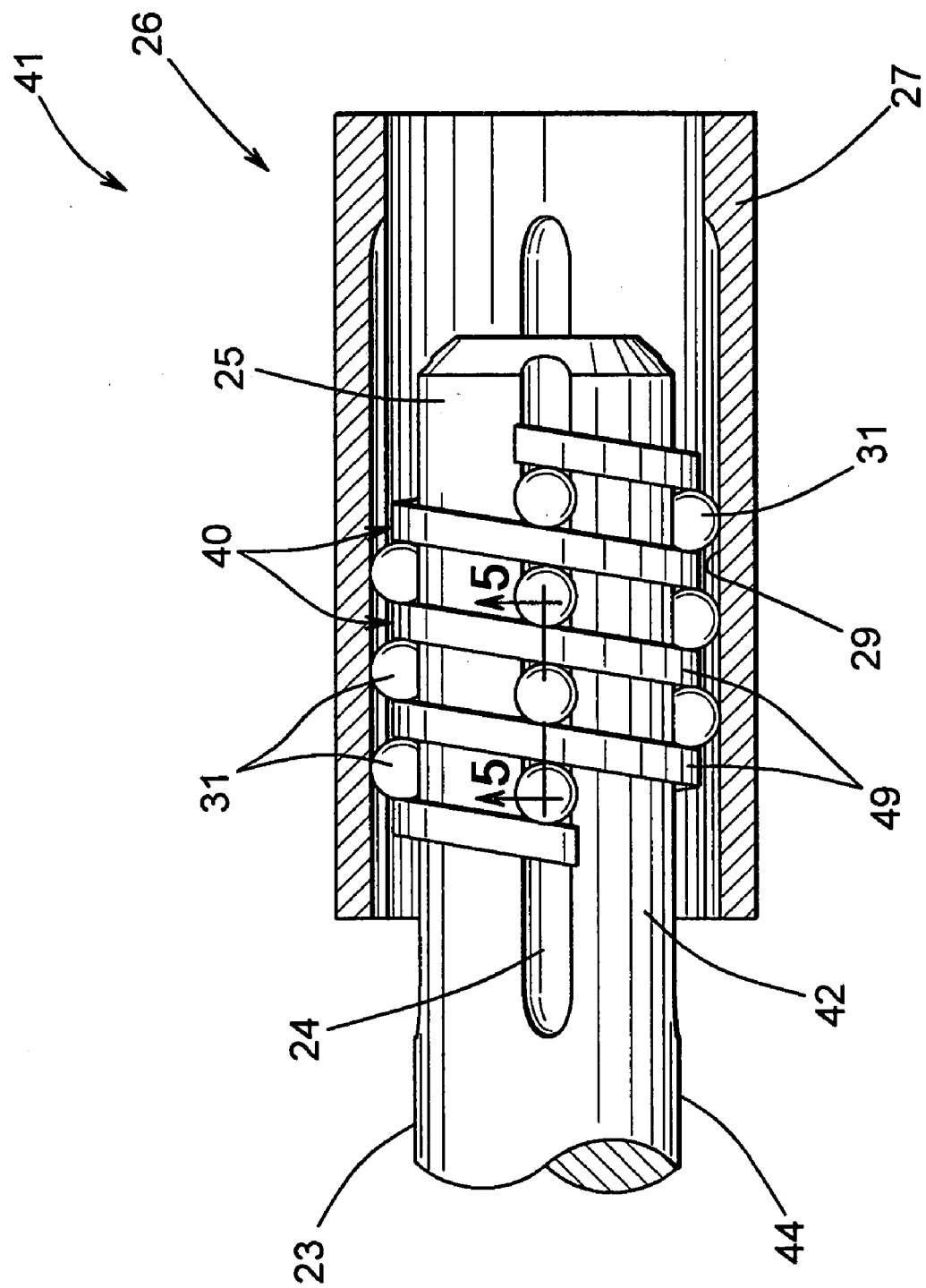
FIG. 4 is an enlarged sectional view of the ball spline type slip yoke assembly shown assembled.

As shown in FIGS. 2 through 4, the ball cage 40 is generally helically shaped and has an inner diameter slightly larger than the outer diameter of the splined portion 42 of the end shaft 23. The cage 40 is preferably formed of a low friction material, such as plastic, and more specifically a nylon material. The plastic is preferably a high strength plastic. The cage 40 also can be made of other materials, including metallic materials such as steel, and low friction composite materials. The spiral cage 40 may be formed by any suitable method, such as by molding. More specifically, a continuous molding process can be used. One of the advantages of incorporating the cage 40 into the slip yoke 26 is that the balls 31 will remain separated from one another, thereby increasing the tendency of the balls to roll along the grooves 24 and 29 rather than slide along the grooves during relative movement between the end shaft 23 and the end shaft 27. The rolling of the balls 31 minimizes frictional resistance in comparison with structures allowing sliding of the balls. Another advantage of the spiral cage 40 is that the balls will remain properly axially distributed along the length of the splined portion 42 of the end shaft 23. Maintaining the proper axial distribution of the balls 31 ensures the most desirable, even distribution of torque forces from the grooves 24 of the end shaft 23 to the grooves 29 of the end shaft 27. Further, the spline area subjected to the torque forces is maintained relatively stable. The use of a plastic cage reduces the weight of the slip joint 26 in comparison with slip joints using conventional metal cages. Also, the manufacturing cost of the spiral cage 40 is significantly less than the manufacturing cost of conventional slip joint cages, which typically require punching openings in a cylindrical metal blank, and typically require close tolerances which are difficult and expensive to obtain.

The cross-sectional shape of the individual coils of the cage 40 can be selected for the optimum benefits for various design objectives. As illustrated in FIG. 5, the cross sectional shape of the cage 40 can be trapezoidal, including generally planar bearing surfaces 46 for sliding engagement with each ball 31. An alternate embodiment of the cage 40 is illustrated in FIG. 6, where the cage 40 includes oppositely oriented bearing surfaces 48 for sliding engagement with the balls 31. The bearing surfaces 48 correspond to the curved shape of the balls 31. The increased contact between the balls 31 and the concave bearing surfaces 48, relative to the more limited contact between the balls 31 and the planar bearing surfaces 46, results in increased plunge force or plunge effort required to move the slip shaft 23 and the slip yoke 26 of the slip joint 41 formed with the cross-sectional shape shown in FIG. 6. It is to be understood that different cross-sectional shapes other than those shown in FIGS. 5 and 6 can be used with the invention. For example, rectangular shapes can be used. The use of a helically shaped cage 40 enables significant weight savings in comparison with conventional slip joint cages. This is borne out by the examples of the cage cross-sections shown in FIGS. 5 and 6, where the cross-sectional width of the cage 40 is less than the diameter of the torque transfer balls 31.

The cage 40 may be of any length to accommodate any number of balls 31. Specifically, the number of balls 31 and the corresponding length of the cage 40 may be determined considering the intended use, the intended torque to be transmitted and the desired deflection stability and strength of the end shaft 23 and the end shaft portion 27. The pitch of the coils 49 in the cage 40 can be any suitable pitch as long as the separation of adjacent balls 31 in the same groove 24 or 29 is maintained. The number of balls 31 associated with each coil 49 preferably equals the number of grooves 24 spaced circumferentially around the splined portion 42 of the end shaft 23.

In accordance with the provisions of the patent statutes, the principle and mode of operation of this invention have been described in its preferred embodiment. However, it should be noted that this invention may be practiced otherwise than as specifically illustrated and described without departing from its spirit or scope.

What is claimed is:

1. A slip joint for connecting first and second components for concurrent rotational movement and for relative axial movement comprising:
   a first component defining a longitudinal axis and including an outer surface having a first groove provided therein that extends generally parallel to said longitudinal axis;
   a second component defining a longitudinal axis and including an inner surface defining an interior and having a second groove provided therein that extends generally parallel to said longitudinal axis, said second component being disposed about said first component such that said first and second grooves are aligned with one another;
   a plurality of balls disposed in said first and second grooves for connecting said first and second components for concurrent rotational movement and for relative axial movement; and
   a helically shaped cage extending between said first and second components and between adjacent ones of said plurality of balls for maintaining said balls in a spaced apart relationship.

2. The slip joint defined in claim 1 wherein said outer surface of said first component has a plurality of first grooves provided therein that each extend generally parallel to said longitudinal axis, said inner surface of said second component has a plurality of second grooves provided therein that each extend generally parallel to said longitudinal axis, said second component being disposed about said first component such that said first and second pluralities of grooves are aligned with one another, a plurality of balls is disposed in each of said first and second pluralities of grooves for connecting said first and second components for concurrent rotational movement and for relative axial movement, and said helically shaped cage extends between adjacent ones of each of said plurality of balls for maintaining said balls in a spaced apart relationship.

3. The slip joint defined in claim 1 wherein said helically shaped cage has a pair of bearing surfaces that engage said balls.

4. The slip joint defined in claim 3 wherein said bearing surfaces are planar.

5. The slip joint defined in claim 4 wherein said helically shaped cage has a generally trapezoidal cross sectional shape.

6. The slip joint defined in claim 4 wherein said helically shaped cage has a generally rectangular cross sectional shape.

7. The slip joint defined in claim 3 wherein said bearing surfaces are concave.

8. The slip joint defined in claim 1 wherein said helically shaped cage is made of a plastic material.

9. The slip joint defined in claim 8 wherein said helically shaped cage is made of nylon.

10. The slip joint defined in claim 8 wherein said helically shaped cage defines a cross-sectional width that is less than a diameter defined by said balls.

11. A drive train assembly for transferring power from a power source to a driven mechanism comprising:
  a first driveshaft section adapted to be connected to a power source;
  a second driveshaft section adapted to be connected to a driven mechanism; and
  a slip joint connecting said first and second driveshaft sections for concurrent rotational movement and for relative axial movement, said slip joint including:
    a first component connected to one of said first and second driveshaft sections, said first component defining a longitudinal axis and including an outer surface having a first groove provided therein that extends generally parallel to said longitudinal axis;
    a second component connected to the other of said first and second driveshaft sections, said second component defining a longitudinal axis and including an inner surface defining an interior and having a second groove provided therein that extends generally parallel to said longitudinal axis, said second component being disposed about said first component such that said first and second grooves are aligned with one another;
    a plurality of balls disposed in said first and second grooves for connecting said first and second components for concurrent rotational movement and for relative axial movement; and
    a helically shaped cage extending between said first and second components and between adjacent ones of said plurality of balls for maintaining said balls in a spaced apart relationship.

12. The slip joint defined in claim 11 wherein said outer surface of said first component has a plurality of first grooves provided therein that each extend generally parallel to said longitudinal axis, said inner surface of said second component has a plurality of second grooves provided therein that each extend generally parallel to said longitudinal axis, said second component being disposed about said first component such that said first and second pluralities of grooves are aligned with one another, a plurality of balls is disposed in each of said first and second pluralities of grooves for connecting said first and second components for concurrent rotational movement and for relative axial movement, and said helically shaped cage extends between adjacent ones of each of said plurality of balls for maintaining said balls in a spaced apart relationship.

13. The slip joint defined in claim 11 wherein said helically shaped cage has a pair of bearing surfaces that engage said balls.

14. The slip joint defined in claim 13 wherein said bearing surfaces are planar.

15. The slip joint defined in claim 14 wherein said helically shaped cage has a generally trapezoidal cross sectional shape.

16. The slip joint defined in claim 14 wherein said helically shaped cage has a generally rectangular cross sectional shape.

17. The slip joint defined in claim 13 wherein said bearing surfaces are concave.

18. The slip joint defined in claim 11 wherein said helically shaped cage is made of a plastic material.

19. The slip joint defined in claim 18 wherein said helically shaped cage is made of nylon.

20. The slip joint defined in claim 18 wherein said helically shaped cage defines a cross-sectional width that is less than a diameter defined by said balls.

* * * * *